Nov. 27, 1962 J. A. WESTPHAL 3,066,255
MAGNETOMETERS AND GRAVIMETERS
Filed Sept. 9, 1959 2 Sheets-Sheet 1
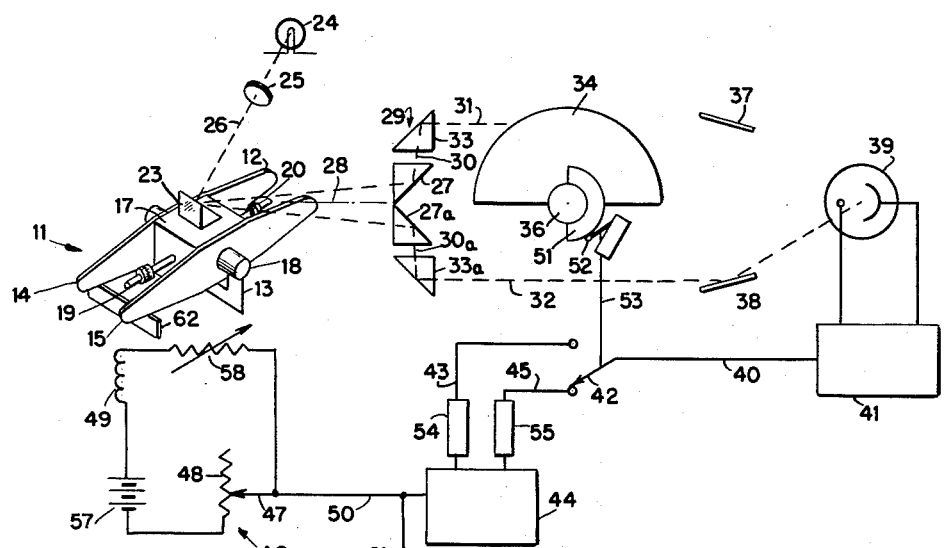
FIG.I
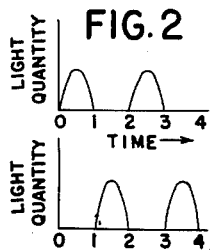
FIG.2
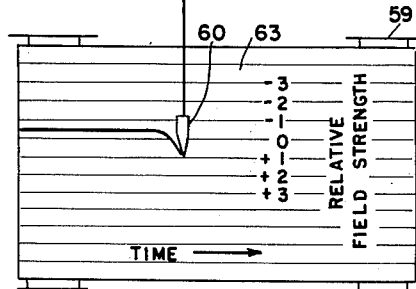
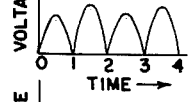
FIG.3
FIG.4
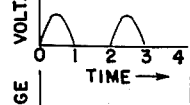
FIG.5
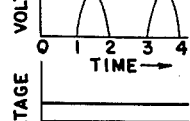
FIG.6
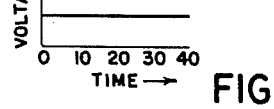
FIG.7
INVENTOR.
James A. Westphal
BY
Adams, Forward & McLean
ATTORNEYS Nov. 27, 1962  J. A. WESTPHAL  3,066,255
MAGNETOMETERS AND GRAVIMETERS
Filed Sept. 9, 1959  2 Sheets-Sheet 2
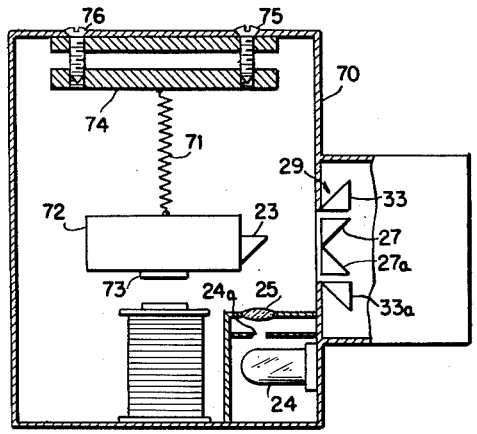
FIG. 8
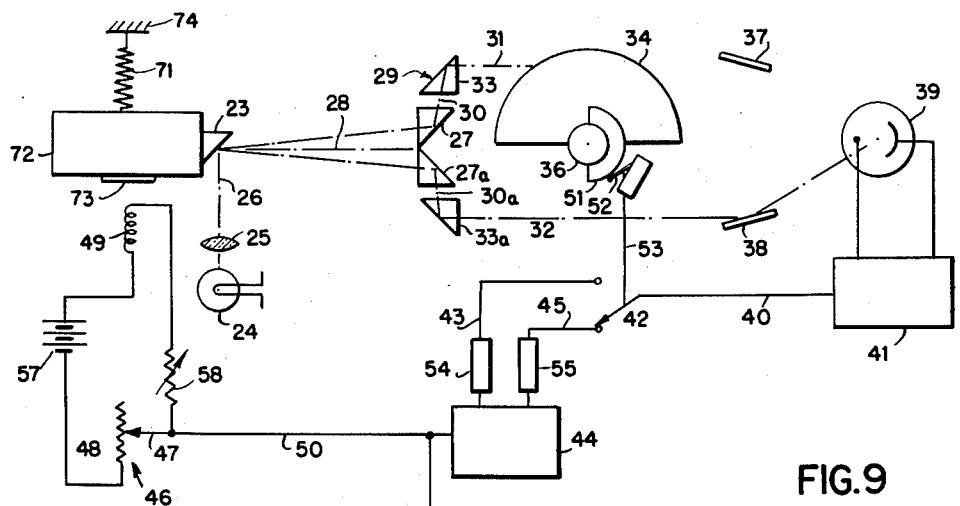
FIG. 9
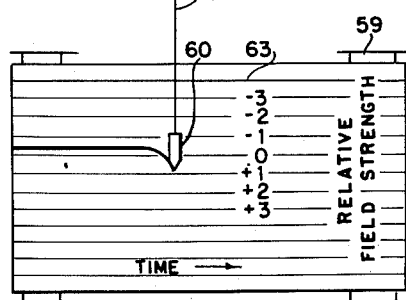
INVENTOR.
James A. Westphal
BY
ATTORNEYS

United States Patent Office 3,066,255
Patented Nov. 27, 1962

3,066,255
MAGNETOMETERS AND GRAVIMETERS
James A. Westphal, Owasso, Okla., assignor, by mesne assignments, to Sinclair Research, Inc., New York, N.Y., a corporation of Delaware
Filed Sept. 9, 1959, Ser. No. 838,919
12 Claims. (Cl. 324—48)

This invention relates to magnetometers and gravimeters. More particularly, it relates to magnetometers and gravimeters suitable for use in geophysical prospecting.

As noted in Dobrin, M. B., Introduction to Geophysical Prospecting, McGraw-Hill Book Company, Inc., New York, 1952, all of the standard geophysical techniques involve surface measurements of significant physical properties of subsurface rocks. Systemic variations in these properties often give evidence of structures or accumulations having economic value. Such variations are referred to as anomalies and these, rather than the absolute values of the physical properties, are most interesting to the geophysicist. Most geophysical interpretation is carried on with the object of determining subsurface geology by analysis of anomalies.

In their investigations, geophysicists employ magnetic, gravity, seismic and electrical methods to detect anomalies. By magnetic methods, they detect and measure variations in the earth's magnetic field which can be attributed to anomalous magnetic properties in relatively shallow subsurface rocks. These variations can result from changes in depth of buried magnetic rock material, from changes in its susceptibility or from both. By gravity methods, they detect variations in the gravitational pull of the rocks which lie as much as several miles below the earth's surface. Any subsurface structures, e.g., salt domes or buried ridges, causing lateral irregularities in density distribution will give rise to corresponding variations along the surface in the force of gravity.

Magnetometers are the instruments commonly used in geophysical prospecting to determine fluctuations in the earth's magnetic field. These magnetometers commonly comprise a balance having a pivotally mounted magnet adapted to move about the pivot when the field in which the magnet is disposed changes and the changes in the field are usually determined by observing the movement of the magnet about the pivot. The term gravimeter or gravity meter is commonly used to denote any instrument in which the acceleration of gravity is determined by measuring the force necessary to support a suspended mass, this force usually being applied by a spring and measured by the extension of the spring. Hence, gravimeters are the instruments commonly used in geophysical prospecting to measure small variations in the vertical component of gravity directly.

Thus, elements in both magnetometers and gravimeters move as changes in the field strengths they measure are detected by the instruments. However, these movements tend to be slight. Given, for instance, that the gravitational acceleration at the earth's surface is about 980 cm./sec.$^2$ or, as geophysicists denominate it in honor of Galileo, about 980 gals and given that anomalies caused by subsurface structures such as salt domes and buried ridges and having economic or scientific importance seldom have peak values of more than 1 or 2 milligals, the movement of the suspended mass in a gravimeter in response to a gravitational field variation is clearly quite small. Consequently, it is of importance to provide such instruments with means of adequate sensitivity and delicacy which can restore them to an equilibrium reading and, in addition, which provide the operator with a greater facility in reading just what field changes have been perceived.

Accordingly, the present invention provides magnetometers and gravimeters having means, i.e., elements, which move in reaction to variations in the field strengths they measure with means responsive to such movements and effective to exert restoring forces upon such elements. Advantageously, means for measuring the magnitude of the restoring forces are also provided.

Thus, the magnetometer of the present invention includes a balance having a pivotally mounted magnet and means responsive to the reaction of the magnet to a change in the magnetic field in which the magnet is situated and effective to exert a restoring force on the magnet counteracting the reaction. Preferably, the magnetometer is also provided with means, e.g., a recorder, for measuring the magnitude of the restoring force. In the resulting instrument, then, the position of the magnet with relation to the pivot is maintained substantially constant by the application of a force, i.e., the restoring force, to counteract the reaction of the magnet to a magnetic field and a change in the magnetic field is determined by observing the restoring force necessary to maintain the position substantially constant. Similarly, the gravimeter of the present invention includes a spring-suspended mass and means responsive to the reaction of the mass to a change of the gravitational field in which the mass is suspended and effective to exert a restoring force on the mass counteracting the reaction. Advantageously, the gravimeter is also provided with means for measuring the magnitude of the restoring force. A recorder can conveniently be used for this purpose. Then, in the resulting instrument, the position of the spring-suspended mass is maintained substantially constant by the application of a force, i.e., the restoring force, to counteract the displacement of the suspended mass from its equilibrium position by a change in the gravitational field acting upon it and such change is determined by observing the restoring force necessary to maintain the position constant.

The Schmidt magnetometer is the most commonly used in geophysical prospecting and the improvement of the present invention is particularly advantageously employed with this type of instrument. The Schmidt magnetometer is described in detail in Dobrin, op. cit. supra. This magnetometer comprises a balance having a magnet eccentrically pivoted (i.e., pivoted near but not at its center of mass) for movement under the influence of a magnetic field. A change in a magnetic field causes displacement of the magnet about the pivot and the magnitude of the change in field is measured by observing the angle of displacement of the magnet. A characteristic of the Schmidt magnetometer is that the angle swept by the magnet is not proportional to the change in field causing the displacement. Hence, a Schmidt magnetometer employing displacement of the magnet as a measure of the magnitude of field change is inaccurate. However, if the improvement of the present invention is employed, the magnitude of a field change is determined by measuring the force necessary to counteract the reaction of the magnet to the change. This force is proportional to the change in field and, therefore, the inaccuracy incidental to the employment of displacement as a measure of the magnitude of field change is eliminated.

Although there is a wide variation in the design of different kinds of gravimeters, there are fundamentally only two types, the stable and the unstable. The stable gravimeter contains a responsive element (such as a spring) with a displacement from equilibrium position proportional or approximately proportional to the change in gravity from its equilibrium value. Since such displacements are always extremely small, they usually must be magnified by optical, mechanical or electrical means. Unstable gravimeters are so designed that any change in gravity from its equilibrium value brings other forces into play which increase the displacement caused by the gravity change alone. In both stable and unstable gravimeters, then, displacement of an element from the equilibrium position is the primary feature of the instruments. However, if the improvement of the present invention is employed in a gravimeter, the magnitude of a field change causing such a displacement, rather than the displacement itself, is determined by measuring the force necessary to counteract the reaction of the responsive element to the change. This force is proportional to the change in field and, therefore, the inaccuracy, intended or not, incidental to the employment of displacement as a measure of field change is eliminated.

For a better understanding of the invention, reference should be had to the accompanying drawings in which:

FIGURE 1 is a schematic representation of a Schmidt magnetometer and the improvement of the present invention;

FIGURE 2 is a graph of light quantity against time for a light beam employed in the operation of the magnetometer depicted in FIGURE 1;

FIGURE 3 is a graph of light quantity against time for another light beam employed in the operation of the magnetometer depicted in FIGURE 1;

FIGURE 4 is a graph of voltage output against time for a phototube of the magnetometer shown in FIGURE 1;

FIGURE 5 is a graph of voltage against time for a power line of the magnetometer shown in FIGURE 1;

FIGURE 6 is a graph of voltage against time for another power line of the magnetometer shown in FIGURE 1;

FIGURE 7 is a graph of the voltage output against time for filters of the magnetometer of FIGURE 1;

FIGURE 8 is a side view of a gravimeter according to the present invention; and, FIGURE 9 is a schematic representation of the gravimeter depicted in FIGURE 8.

Referring to the drawing, the magnetometer comprises a balance 11 having a magnet 12 pivotally mounted on a knife-edge 13. The magnet 12 has two magnetic elements 14 and 15 each formed of magnetic material and fixedly secured to a non-magnetic center block 17. The magnet also comprises a suspension pin 18, and latitude and temperature compensating weights 19 and 20. The magnet is eccentrically mounted on the knife-edge 13 as is characteristic of Schmidt magnetometers, and is adapted to move under the influence of a change in the magnetic field in which it is disposed.

The magnetometer is provided with a fixedly positioned light 24 and a fixedly positioned lens 25 which focuses light from light 24 into light beam 26. A mirror 23 fixedly mounted on center block 17 intercepts light beam 26 and reflects light therefrom into light beam 28. Since the mirror 23 is mounted on the magnet 12, the mirror moves when the magnet moves on the knife-edge 13 and hence the position of light beam 28, from the mirror 23 is dependent on the position of the magnet. In place of the mirror 23 any other suitable light beam source fixedly mounted on the magnet 12 can be used.

The magnetometer comprises means responsive to the position of the light beam 28 and effective to exert a restoring force on the magnet which opposes a change in force acting on the magnet due to a change of the magnetic field. This means comprises a light beam divider 29 formed of mirrors 27 and 27a, which intercept and divide the light beam 28 into separate light beams 30 and 30a, and auxiliary mirrors 33 and 33a which respectively intercept separate light beams 30 and 30a and direct the light in these beams into parallel separate light beams 31 and 32.

Mirrors 37 and 38 are positioned respectively in the path of parallel separate light beams 31 and 32 and direct the light of these beams to phototube 39. The phototube is connected to amplifier 41 which amplifies the phototube output voltage and energizes commutator 42 to which it is connected by power line 40.

The commutator 42 is synchronously connected with a shutter 34 which is rotatably mounted on shaft 36 and alternately cuts out first one and then the other of parallel separate light beams 31 and 32 thus exposing phototube 39 to first one and then the other of the separate light beams. Synchronization is effected by cam 51, which is rotatably mounted on shaft 36, and fixedly positioned cam follower 52 which is connected with commutator 42 by arm 53.

Thus, the voltage at commutator 42 alternates between a voltage corresponding to the output of the phototube for separate light beam 31 and the output of the phototube for separate light beam 32. The commutator connects these voltages, respectively, with power lines 43 and 45 which each connect with one of the sides of servo-amplifier 44. Filters 54 and 55 are connected, respectively, in power lines 43 and 45 and supply each side of the servo-amplifier with a direct constant voltage.

The servo-amplifier compares the voltage in power line 43 with the voltage in power line 45 and based on this comparison controls the current flowing in circuit 46 which includes coil 49 positioned so that its field will influence the magnet 12. The circuit 46 includes power source 57, zeroing variable resistor 58 and a variable resistor 48 connected in series in the circuit by contact 47. The servo-amplifier 44 and circuit 46 are interconnected by servo-amplifier output arm 50 which is mechanically connected with contact 47 of variable resistor 48. The servo-amplifier output arm, and hence the servo-amplifier, controls the position of contact 47 of variable resistor 48 and therefore controls the current flowing in coil 49 and the field of the coil which influences the magnet 12.

The magnetometer is advantageously used to detect changes in field at a point in the earth's magnetic field. When so used, upon a change in the field, the magnet 12 moves slightly on the knife-edge 13. The light beam 28 is displaced as an incident of this movement, and this causes a disparity between the light quantity in parallel separate light beams 31 and 32. The phototube 39 is a light quantity measuring means and senses this disparity and supplies voltages of different magnitude to the servo-amplifier 44. The servo-amplifier compares these voltages, and hence the light quantities in the separate light beams, and moves contact 47 of variable resistor 48 in circuit 46 so that the current flowing through coil 49 increases or decreases so as to exert on the magnet 12 a restoring force equal and opposite to the change in force acting on the magnet due to the change in the earth's field. Thus, the magnet 12 is returned to its initial position, and the instrument operates to maintain the magnet 12 in a substantially fixed position on the knife-edge 13.

The change in current through coil 49 necessary to restore the magnet 12 to the initial position following a change in the earth's field is proportional to the change in the earth's field. Hence, movement of the contact 47 is a measure of, and is proportional to, relative field strength.

Advantageously, a recorder 59 is used to record movement of the contact 47 and thus to provide a history of changes in the earth's field at the place where the magnetometer is positioned. The recorder comprises a roll chart 63 having an arithmetical scale of relative field strength, and pen 60 which is mechanically connected by arm 61 with the servo-amplifier output arm 50 which in turn is connected with the contact 47.

For use when putting the magnetometer in operation, there is provided a movable permanent magnet 62 positioned adjacent to the magnet 12 so that its field influences the position of the magnet 12. By movement of the permanent magnet 62, the magnet 12 can be brought to a rough balance before the light 24 is turned on.

After obtaining a rough balance, the light 24 can be turned on and the instrument will then automatically adjust to and maintain a position such that the quantity of light in separate light beams 31 and 32 is equal.

For use in zeroing the instrument, the circuit 46 is provided with a variable resistor 58. By coordinating the operation of the variable resistor 58 and movable permanent magnet 62, the instrument can be zeroed on the roll chart 63 of recorder 59 when desired.

FIGURES 2 through 6 are graphs representing the operations of various components of the magnetometer.

FIGURE 2 and FIGURE 3 illustrate respectively the variation in light quantity with time for separate light beams 31 and 32 between the shutter 34 and phototube 39. FIGURE 4 illustrates the voltage output of the phototube 39. FIGURE 5 and FIGURE 6 illustrate respectively the voltage in power lines 43 and 45. FIGURE 7 represents the voltage outputs of the filters 54 and 55 to the servo-amplifier 44 which compares voltages and is effective to cause the application of a restoring force to the magnet 12 and eliminate the voltage difference.

FIGURE 8 shows a case 70 for vertically suspended helical spring 71 and mass or, as it is colloquially known, weight 72. Weight 72 is suspended from the lower end of spring 71 of the gravimetric unit. The weight can be of iron or lead with an iron core or, as shown, of lead with a piece of iron 73 affixed thereto. Any ferrous metal used in this relation should, of course, be of negligible magnetic retentivity. As shown, spring 71 is suspended from cross-piece 74 which is adjustably held by at least two screws 75 and 76 penetrating the reinforced top of case 70. By means of screws 75 and 76, cross-piece 74 can be raised or lowered and a rough adjustment of the height of weight 72 in relation to a fixed point (not shown) on case 70 and, thereby, in relation to a standard or average gravitational field in the locale being prospected can be had.

A separate compartment in case 70 partially encloses fixedly positioned light 24 and fixedly positioned lens 25 is set into the top of such compartment so as to focus light beam 26 (shown in FIGURE 9) emanating from light 24 and passing through aperture 24a. A mirror 23 fixedly mounted on weight 72 intercepts light beam 26 from light 24 and reflects it into light beam 28. Since the mirror 23 is mounted on weight 72, the mirror moves when the weight moves in response to a change in the gravitational field in which the weight finds itself. The position of light beam 28 from mirror 23 is, therefore, dependent on the position of the weight. In place of mirror 23, any other suitable light beam source fixedly mounted on weight 72 can be used. Further, the gravimeter case 70 includes a light beam divider 29, such as is employed in the magnetometer depicted in FIGURE 1, formed of mirrors 27 and 27a which intercept and divide the light beam 28 into separate light beams 30 and 30a and direct the light in these beams into parallel separate light beams 31 and 32.

The remainder of the gravimetric unit of the present invention is shown schematically in FIGURE 9 and its parts operate in substantially the same fashion as the identically numbered parts of the magnetometer of FIGURE 1, described above. However, whereas the current flowing in coil 49 and the field thereby produced influence the magnet 12 of the magnetometer of FIGURE 1, so as to exert on the magnet a restoring force equal and opposite to the change in force acting on the magnet due to the change in the earth's magnetic field and so as to maintain the magnet in a substantially fixed position, the current flowing in coil 49 and the magnetic field thereby produced influence the piece of ferrous metal 73 affixed to weight 72 and, therefore, weight 72 of the gravimeter of FIGURE 9, so as to exert on them a restoring force equal and opposite to the change in force acting on them due to the change in the earth's gravitational field and so as to maintain them in a substantially fixed position.

This is a continuation-in-part of copending application Serial No. 684,352, filed September 16, 1957, and now abandoned.

What I claim is:

1. In magnetometric and gravimetric instruments having means moving under the influence of the magnetic and gravitational fields measured by said instruments, the combination of said moving means, a light beam source, means associated with said light beam source mounted on said moving means for directing the light beam generated by said source whereby the position of a light beam from said source is dependent on the position of said moving means, light beam divider means positioned to intercept said light beam for dividing it into separate light beams whereby separate light beams differing in light quantity are obtained depending upon the position of said moving means, a light quantity measuring means associated with each of the two separate light beams, and means responsive to the light quantity measuring means and effective to exert a restoring force on said moving means equal and opposite to the change in force acting on said moving means due to a change in the field being measured whereby said moving means are maintained in a substantially fixed position.

2. Magnetometers and gravimeters according to claim 1 having only one light quantity measuring means, and comprising shutter means for alternately exposing said light quantity measuring means to first one and then the other of said two separate light beams, comparing means operatively connected with the light quantity measuring means for comparing light quantities of the separate light beams, means synchronously connecting the shutter means being effective to operatively control the means responsive to the light quantity measuring means and effective to exert a restoring force on the moving means.

3. Magnetometers and gravimeters according to claim 2, the means responsive to the light quantity measuring means and effective to exert a restoring force on the moving means comprising an electric circuit having a coil, variable resistance, and power supply source, the coil being positioned so that its field influences the position of the moving means, and the comparing means being operatively connected to the variable resistance whereby coil field strength is controlled by the comparing means.

4. Magnetometers and gravimeters according to claim 3 comprising means for measuring the restoring force.

5. A magnetometer comprising a balance having a magnet eccentrically pivoted for movement under the influence of a magnetic field, a light beam source, means associated with said light beam source mounted on said magnet for directing the light beam generated by said source whereby the position of a light beam from said source is dependent on the position of the magnet, light beam divider means positioned to intercept said light beam for dividing it into separate light beams whereby separate light beams differing in light quantity are obtained depending upon the position of the magnet, a light quantity measuring means associated with each of the two separate light beams, and means responsive to the light quantity measuring means and effective to exert a restoring force on the magnet equal and opposite to the change in force acting on the magnet due to a change in the magnetic field whereby said magnet is maintained in a substantially fixed position on the balance.

6. A magnetometer according to claim 5 having only one light quantity measuring means, and comprising shutter means for alternately exposing said light quantity measuring means to first one and then the other of said two separate light beams, comparing means operatively connected with the light quantity measuring means for comparing light quantities of the separate light beams, means synchronously connecting the shutter means and comparing means, said comparing means being effective to operatively control the means responsive to the light quantity measuring means and effective to exert a restoring force on the magnet.

7. A magnetometer according to claim 6, the means responsive to the light quantity measuring means and effective to exert a restoring force on the magnet comprising an electric circuit having a coil, variable resistance, and power supply source, the coil being positioned so that its field influences the position of the magnet, and the comparing means being operatively connected to the variable resistance whereby coil field strength is controlled by the comparing means.

8. A magnetometer according to claim 7 comprising means for measuring the restoring force.

9. A gravimeter comprising a spring vertically suspended from a fixed position, a weight suspended from said spring for movement under the influence of a gravitational field, a light beam source, means associated with said light beam source mounted on said weight for directing the light beam generated by said source whereby the position of a light beam from said source is dependent on the position of the weight, light beam divider means positioned to intercept said light beam for dividing it into separate light beams whereby separate light beams differing in light quantity are obtained depending upon the position of the weight, a light quantity measuring means associated with each of the two separate light beams, and means responsive to the light quantity means and effective to exert a restoring force on the weight equal and opposite to the change in force acting on the weight due to a change in the gravitational field whereby said weight is maintained in a substantially fixed position on the spring.

10. A gravimeter according to claim 9 having only one light quantity measuring means, and comprising shutter means for alternately exposing said light quantity measuring means to first one and then the other of said separate two separate light beams, comparing means operatively connected with the light quantity measuring means for comparing light quantities of the separate light beams, means synchronously connecting the shutter means and comparing means, said comparing means being effective to operatively control the means responsive to the light quantity measuring means and effective to exert a restoring force on the weight.

11. A gravimeter according to claim 10, the means responsive to the light quantity measuring means and effective to exert a restoring force on the weight comprising an electric circuit having a coil, variable resistance, and power supply source, the coil being positioned so that its field influences the position of the weight, and the comparing means being operatively connected to the variable resistance whereby coil field strength is controlled by the comparing means.

12. A gravimeter according to claim 11 comprising means for measuring the restoring force.

References Cited in the file of this patent

UNITED STATES PATENTS

| | | |
|---|---|---|
| 2,059,786 | Gilbert | Nov. 3, 1936 |
| 2,151,627 | Vacquier | Mar. 21, 1939 |
| 2,660,062 | Frowe | Nov. 24, 1953 |
| 2,809,524 | Masterson | Jan. 11, 1954 |